(12) United States Patent
Nishimo et al.

(10) Patent No.: US 12,486,894 B2
(45) Date of Patent: Dec. 2, 2025

(54) SHIFT LEVER

(71) Applicants: DELTA KOGYO CO., LTD., Hiroshima (JP); MAZDA MOTOR CORPORATION, Hiroshima (JP)

(72) Inventors: Keita Nishimo, Hiroshima (JP); Tetsuya Obata, Hiroshima (JP); Yoh Yamazaki, Hiroshima (JP); Yohsuke Takenaga, Hiroshima (JP); Akira Michinaga, Hiroshima (JP)

(73) Assignees: DELTA KOGYO CO., LTD., Hiroshima (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/728,347

(22) PCT Filed: Dec. 21, 2022

(86) PCT No.: PCT/JP2022/047067
§ 371 (c)(1),
(2) Date: Jul. 11, 2024

(87) PCT Pub. No.: WO2023/145314
PCT Pub. Date: Aug. 3, 2023

(65) Prior Publication Data
US 2025/0067337 A1     Feb. 27, 2025

(30) Foreign Application Priority Data

Jan. 28, 2022  (JP) ................................ 2022-012334
Jan. 28, 2022  (JP) ................................ 2022-012335
Jan. 28, 2022  (JP) ................................ 2022-012336

(51) Int. Cl.
*F16H 59/02*         (2006.01)

(52) U.S. Cl.
CPC . *F16H 59/0278* (2013.01); *F16H 2059/0282* (2013.01)

(58) Field of Classification Search
CPC .................... F16H 2059/0282; F16H 59/0278
See application file for complete search history.

(56) References Cited

U.S. PATENT DOCUMENTS 9,046,164 B2 *   6/2015  Choi .................... F16H 59/0278
2017/0328464 A1 * 11/2017 Yamamura .......... F16H 59/0278

FOREIGN PATENT DOCUMENTS

CN    207921312 U    9/2018
JP    S56-098728 U   8/1981
(Continued)

OTHER PUBLICATIONS

International Search Report issued in PCT/JP2022/047067; mailed Mar. 14, 2023.

*Primary Examiner* — Gregory Robert Weber
(74) *Attorney, Agent, or Firm* — Studebaker Brackett PLLC

(57) ABSTRACT

A shift lever includes a lever main body and a shift knob located at a distal end of the main body. The lever main body has a lever shaft and a push rod located in the lever shaft. The shift knob has a button for unlocking that receives a pushing manipulation force in a direction intersecting the push rod, a holder fixed to the lever shaft for holding the button, and a converter that converts a momentum in a pushing manipulation direction of the button into a momentum in an axial direction of the push rod to shift the push rod. The converter has a pushed surface to be pushed by the button, the pushed surface occupying only a region of the converter that is away from a central axis of the push rod in a releasing direction that is opposite to a pushing direction.

13 Claims, 10 Drawing Sheets

(56) References Cited

FOREIGN PATENT DOCUMENTS

JP        S60-109123 U    7/1985
JP        H04-107564 U    9/1992

\* cited by examiner

FRONT ←——→ REAR

SHIFT LEVER

TECHNICAL FIELD

The present invention relates to a shift lever that receives a change manipulation for an automatic transmission in an automobile.

BACKGROUND ART

An automobile including an automatic transmission is provided with a shift lever for a change between a parking range (P) and other range. The shift lever includes a lever main body extending upward from a shift device and a shift knob located at an upper end of the lever main body. A driver grips the shift knob to manipulate the shift lever.

The shift knob, has an unlocking button (hereinafter, simply referred to as a "button"). The shift lever is released from a locked state in response to a pushing manipulation to the button, and can change the range. Briefly, the lever main body has a lever shaft and a push rod (called a "detent rod" as well) located in the lever shaft. The push rod shifts downward in conjunction with the pushing manipulation to the button of the shift knob. The downward shifting releases the shift lever from the locked state. Conversely, letting go of the button makes the push rod shift upward to return to its original position with an urging force of a spring, resulting in locking the shift lever at a position for a selected range.

For instance, a shift lever includes a shift knob having a button at the front portion. The shift knob incorporates a mechanism for converting rearward push to the button into downward shift of a push rod. Patent Literature 1 discloses a shift lever including such a mechanism.

The shift lever in Patent Literature 1 includes a shift knob having a slider or a converter slidable in an up-down direction. The slider is coupled to an upper end of a push rod. The slider has an upper portion having a slope (slanting flat surface) rising as advancing rearward, and a button is in contact with the slope. Specifically, the button moves rearward in response to a pushing manipulation, the slider accordingly moves downward via the slope, and as a result, the push rod shifts downward.

The shift lever in Patent Literature 1 includes an inner core or a holder fixed to an upper end of the lever main body. The slider extends slidably in a guide hole of the inner core. The slider has left and right side surfaces each formed with protrusions extending in the up-down direction, and left and right inner surfaces defining the guide hole are formed with guide grooves for guiding the protrusions.

In the conventional shift lever disclosed in Patent Literature 1, the slope of the slider extends in a front-rear direction across the position of the push rod, and a contact position of the button relative to the surface of the slope changes from the front to the rear across the position of the push rod in progress of a button manipulation.

In the conventional shift lever, a rotation moment acts on the slider around a distal end of the push rod serving as a fulcrum, and the rotation moment is reversed in the opposite direction in progress of the button manipulation. The reversal rotation moment may change the tilting direction of the slider. Such a change makes the slider collide with a wall defining the guide hole, and an abnormal sound may occur. Besides, tilting of the slider attributed to the rotation moment may make, for example, an edge portion of the slider rub against the wall defining the guide hole, resulting in impeding the slider from smoothly sliding.

CITATION LIST

Patent Literature

Patent Literature 1: Chinese Utility-Model Registration Number 207921312

SUMMARY OF INVENTION

The present invention has been achieved in view of the circumstances described above, and has an object of providing a shift lever that enables a slider (or a converter) to move in a more stable posture in the pushing manipulation to button.

A shift lever according to one aspect of the present invention is a shift lever that receives a manipulation to change a range of an automatic transmission in a vehicle. The shift lever includes: a lever main body; and a shift knob located at a distal end of the main body. The lever main body has a lever shaft and a push rod located in the lever shaft to be urged toward the distal end. The shift knob has a button for unlocking that receives a pushing manipulation force in a direction intersecting the push rod, a holder fixed to the lever shaft for holding the button, and a converter held by the holder slidably in an axial direction of the push rod by contact with a distal end of the push rod for converting a momentum in a pushing manipulation direction of the button into a momentum in the axial direction to shift the push rod. The converter has a pushed surface to be pushed by the button in response to the pushing manipulation force to move the converter in the axial direction. The pushed surface occupies only a region of the converter that is away from a central axis of the push rod in a releasing direction that is opposite to a pushing direction.

DESCRIPTION OF EMBODIMENTS

Hereinafter, a preferable embodiment of the present invention will be described with reference to the accompanying drawings.

Overall Configuration of a Shift Lever 1

Figure 1:
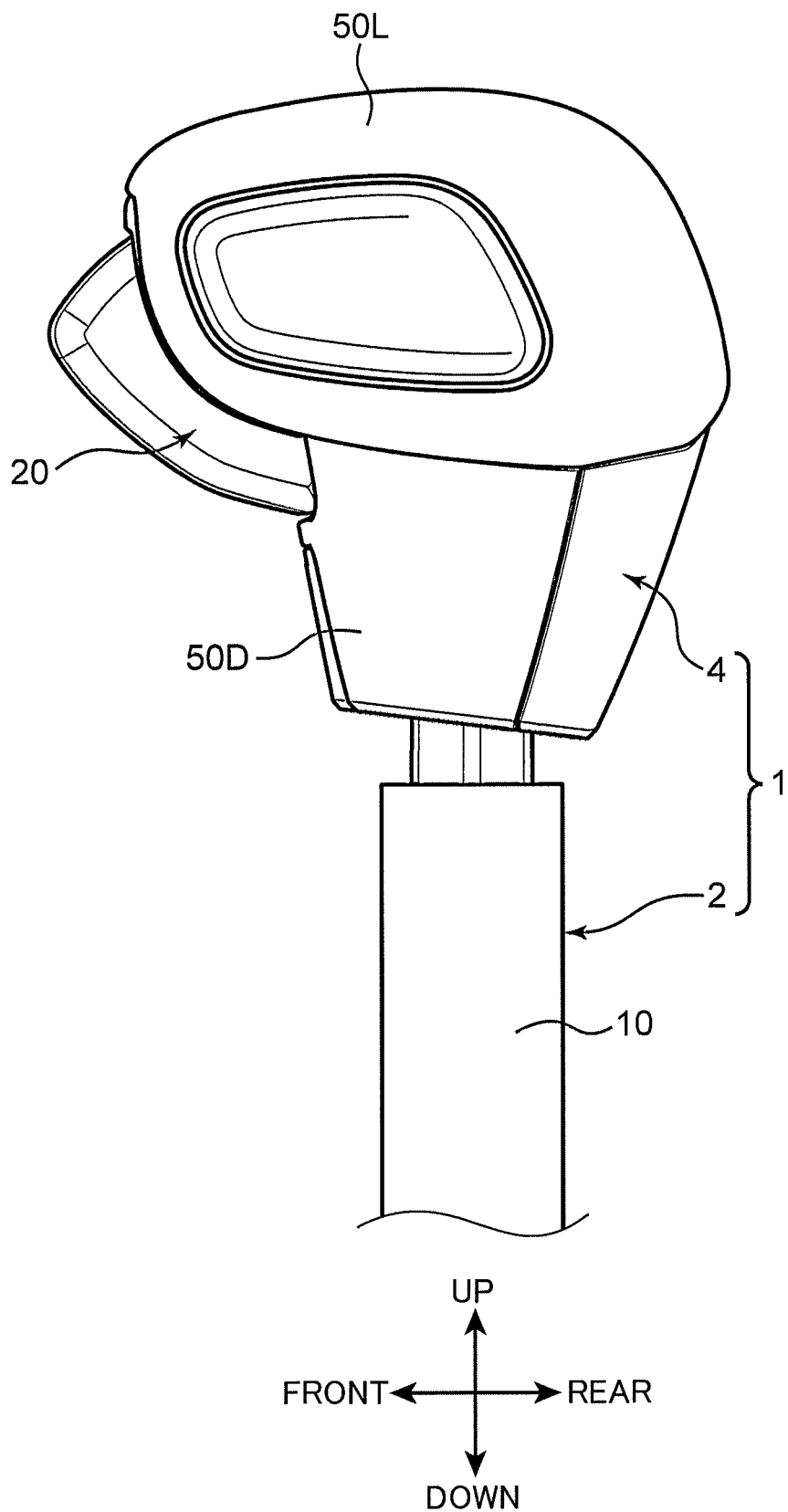
FIG. 1 is a side view or a left side view of a shift lever according to the present invention.
Figure 2:
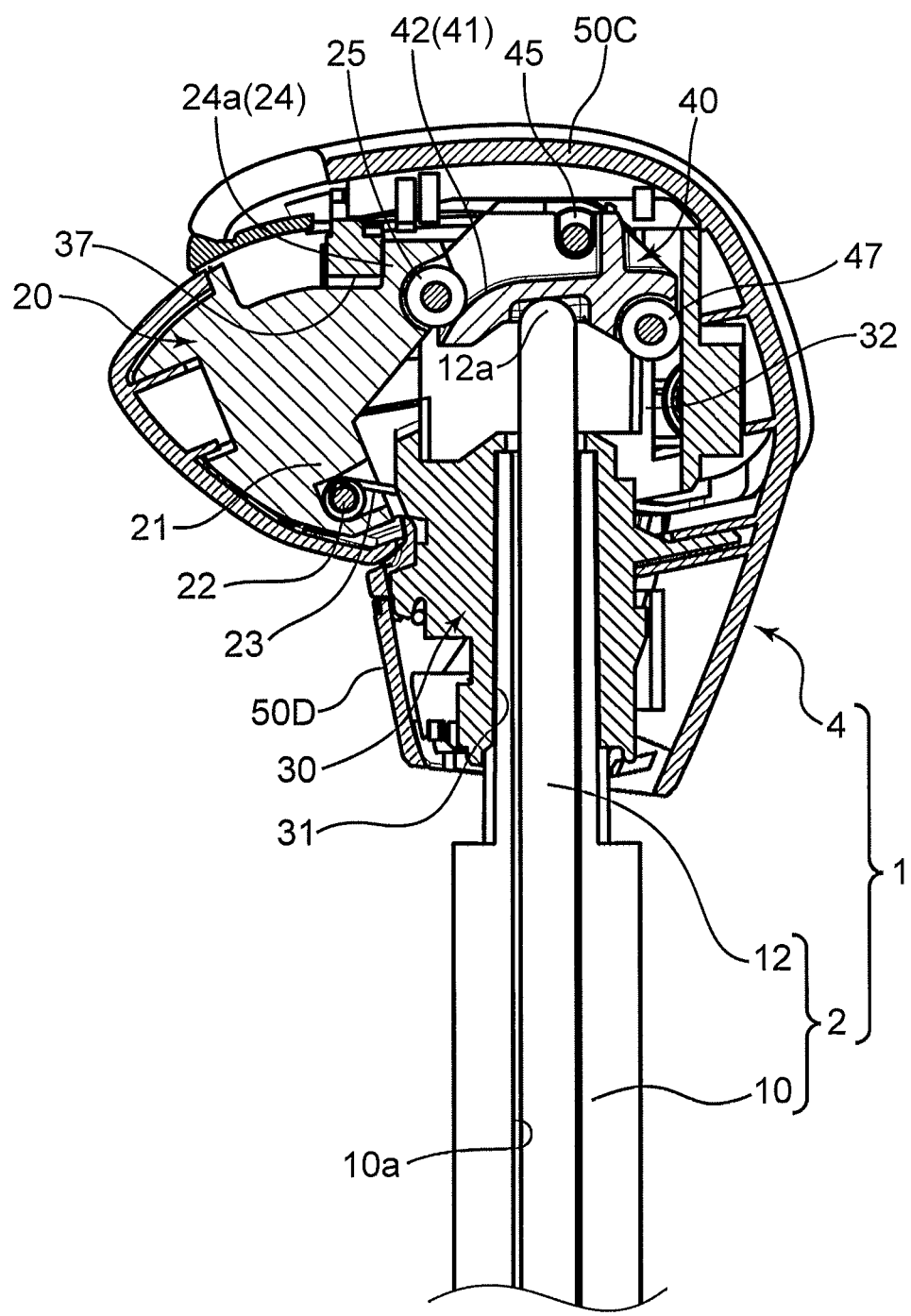
FIG. 2 is a cross-sectional view of the shift lever.
Figure 2:
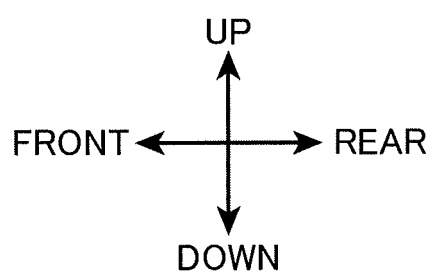
Figure 3:
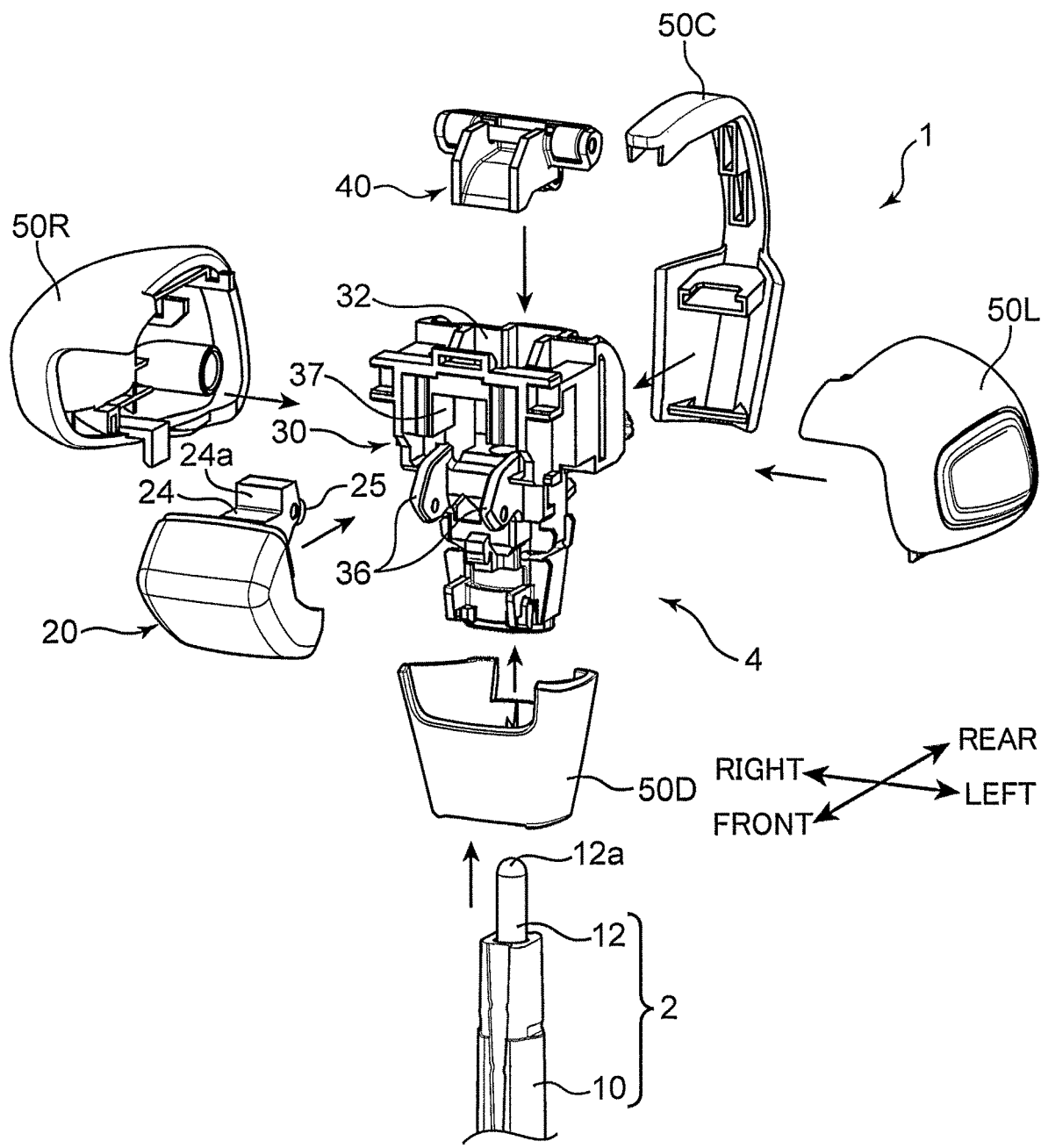
FIG. 3 is an exploded perspective view of the shift lever.

FIG. 1 to FIG. 3 illustrate the shift lever 1 according to the present invention. FIG. 1 is a side view (or a left side view) of the shift lever 1, FIG. 2 is a cross-sectional view of the shift lever 1, and FIG. 3 is an exploded perspective view of the shift lever 1.

The shift lever 1 is arranged at a center console located between a driver's seat and a passenger seat in an automobile including an automatic transmission. The directions including a front-rear direction, a left-right direction, and an up-down direction as used in the description below are defined with respect to the shift lever 1 arranged at the center console in the automobile.

The shift lever 1 includes a lever main body 2 extending in the up-down direction and a shift knob 4 assembled to an upper end (or a distal end) of the lever main body. The shift lever 1 has a lower end connected to an unillustrated shift device in a swingable manner. A driver manipulates the shift lever 1 in a swingable manner to enable the shift device to change a range among, for example, a parking range (P), a reverse range (R), a neutral range (N), and a drive range (D). Kinds of ranges are not limited to these ranges.

The lever main body 2 has a lever shaft 10 made of metal or resin and connected to the shift device in a swingable manner, a push rod 12 made of metal or resin and located in the lever shaft 10, and an unillustrated compression coil spring that urges the push rod 12. The push rod 12 is also called a detent rod.

The lever shaft 10 is a cylindrical shaft member having, in the center thereof, a shaft hole 10a extending in an axial direction and having a circular shape in cross-section. The push rod 12 is a shaft member having a circular shape in cross-section, held in the shaft hole 10a of the lever shaft 10 in a shiftable manner in the axial direction, and urged upward by the compression coil spring.

The push rod 12 is configured to be engaged with and disengaged from an unillustrated detent mechanism included in the shift device. Specifically, the push rod 12 is pushed upward with the urging force of the compression coil spring to be engaged with the detent mechanism and is pushed downward against the urging force of the compression coil spring to be disengaged from the detent mechanism. The detent mechanism prevents the lever main body 2 from swinging in the engaged state of the push rod 12 and allows the lever main body 2 to swing in the disengaged state. In other words, the shift lever 1 is locked at a position for a selected range in the state where the push rod 12 is engaged with the detent mechanism, and the shift lever 1 is allowed to change the range in the disengaged state.

The shift knob 4 is a portion to be griped by the driver for a manipulation to change a range, and is assembled to the upper end of the lever main body 2 as described above. The shift knob 4 has a holder 30 serving as a base of the shift knob 4, an unlocking button 20 (hereinafter, abbreviated as a "button 20") for releasing the shift lever 1 from the locked state, a slider 40 that shifts the push rod 12 in conjunction with a manipulation to the unlocking button 20, and covers.

The holder 30 is a substantially quadrangular block-shaped member which is made of resin and is slightly thin and long in the up-down direction. The holder 30 has a lower center portion formed with a fitting hole 31 extending in the center in the up-down direction and opening to a lower surface of the holder 30. The fitting hole 31 receives the upper end of the lever main body 2 to fit therein. The holder 30 and the lever shaft 10 are fixed to each other with an unillustrated fixing spring. In this manner, the holder 30 is assembled to the upper end of the lever main body 2.

The button 20 is arranged at a front portion of the shift knob 4 to receive a pushing manipulation of the driver for a change in a range.

As illustrated in FIG. 2, the button 20 has a triangular prism shape slightly pointed frontward and extending in the left-right direction. The button 20 is supported by the front portion of the holder 30 in a swingable manner. Specifically, the button 20 has a rear lower portion provided with a protrusion 21 having a plate shape and protruding rearward. The protrusion 21 is located between a pair of left and right attachment parts 36 protruding frontward from a front surface of the holder 30. The protrusion 21 is coupled to the pair of attachment parts 36 via a shaft 22 extending in the left-right direction.

In this configuration, the holder 30 supports the button 20 to be swingable around the rear lower portion (the shaft 22) serving as a fulcrum in the front-rear direction, that is, to be pushed rearward.

The button 20 has a rear upper portion (above the protrusion 21) provided with a pushing part 24 protruding rearward. The pushing part 24 pushes the slider 40 in response to the pushing manipulation force to the button 20.

The pushing part 24 has a leading end which is in a guide recess part 32 of the holder 30 to be described later through an opening part 37 in the front surface of the holder 30. The leading end of the pushing part 24 is provided with a pushing roller 25. The pushing part 24 pushes the slider 40 via the pushing roller 25.

A helical torsion coil spring 23 is wound on the shaft 22. The button 20 is urged frontward from the holder 30 with an elastic force of the helical torsion coil spring 23. Technically, the button 20 is urged counterclockwise (in FIG. 2) around the shaft 22 serving as the center.

The leading end of the pushing part 24 is provided with a stopper 24a to engage with an upper edge of the opening part 37 through an inside of the guide recess part 32. As illustrated in FIG. 2, the button 20 is at a home position where the stopper 24a engages with the upper edge of the opening part 37. The button 20 is held at the home position with the urging force of the helical torsion coil spring 23 until receiving a pushing manipulation.

The slider 40 is a converter that convers a momentum in a pushing manipulation direction of the button 20 into a momentum in an axial direction of the push rod 12. In this example, the slider 40 converts a rearward momentum of the button 20 into a downward momentum of the push rod 12.

Figure 4:
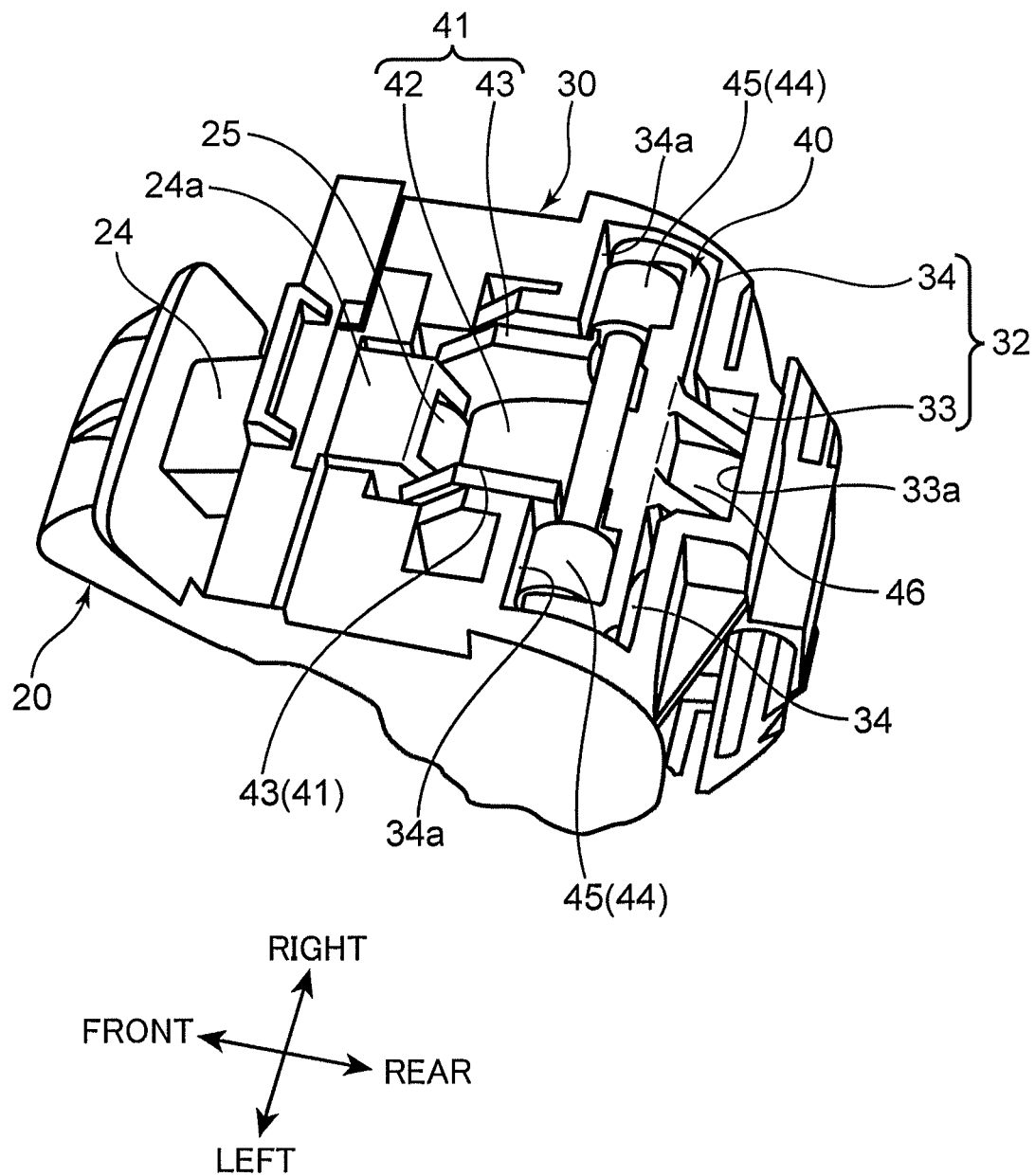
FIG. 4 is a perspective view of a shift knob seen from above in an uncovered state.
Figure 5:
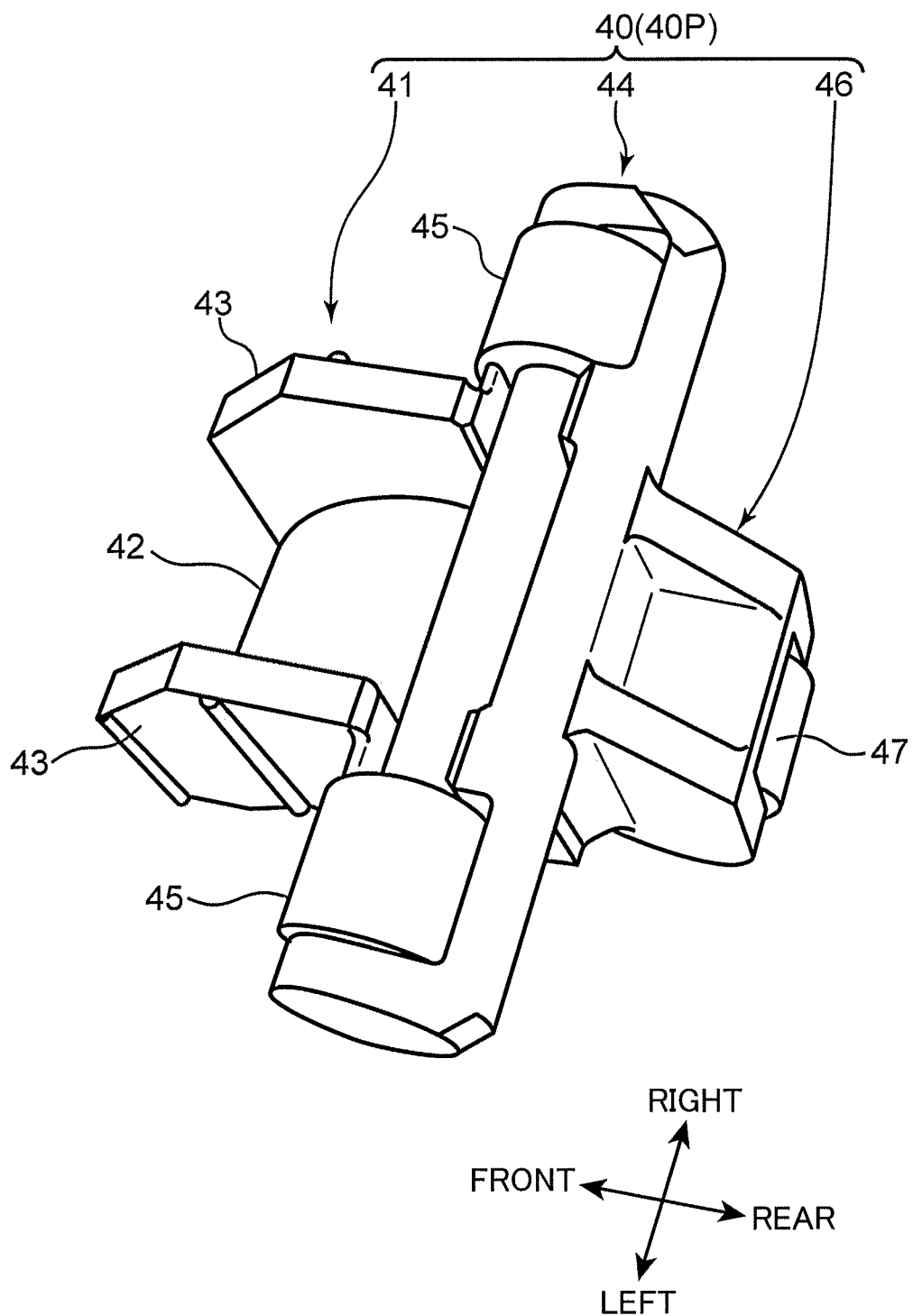
FIG. 5 is a perspective view of a slider.
Figure 6A:
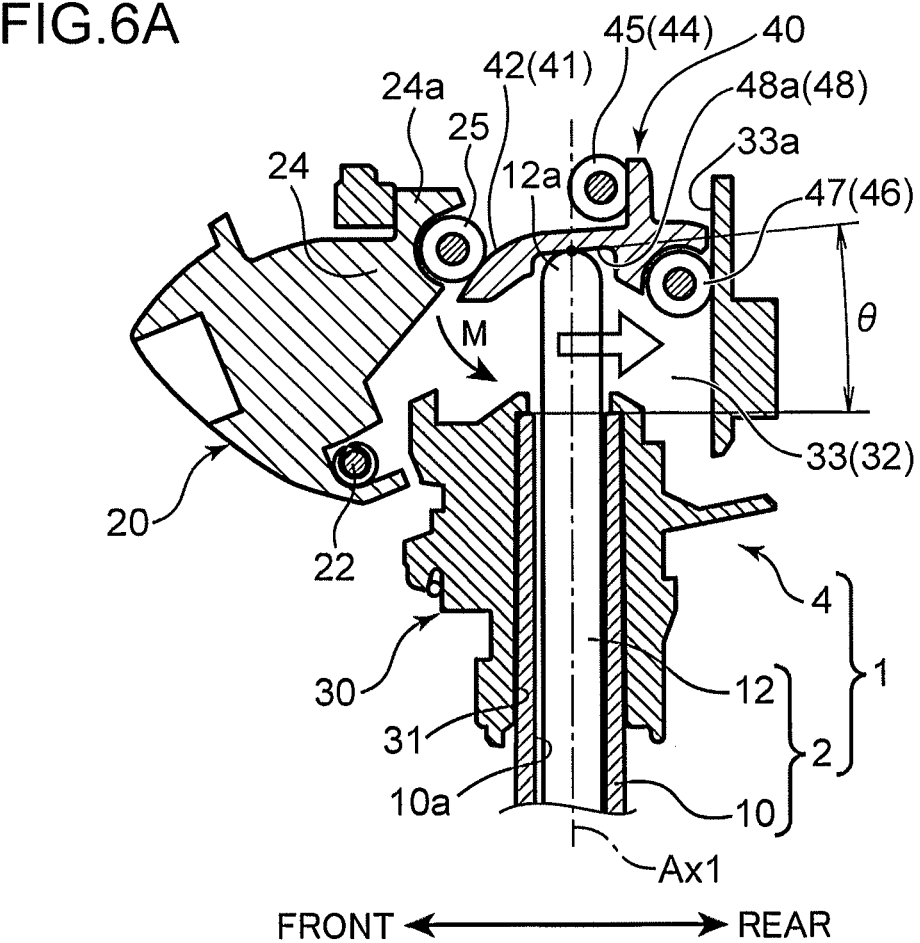
FIG. 6A is a cross-sectional view of main components of the shift knob together with a cross-sectional view of a push rod.
Figure 7:
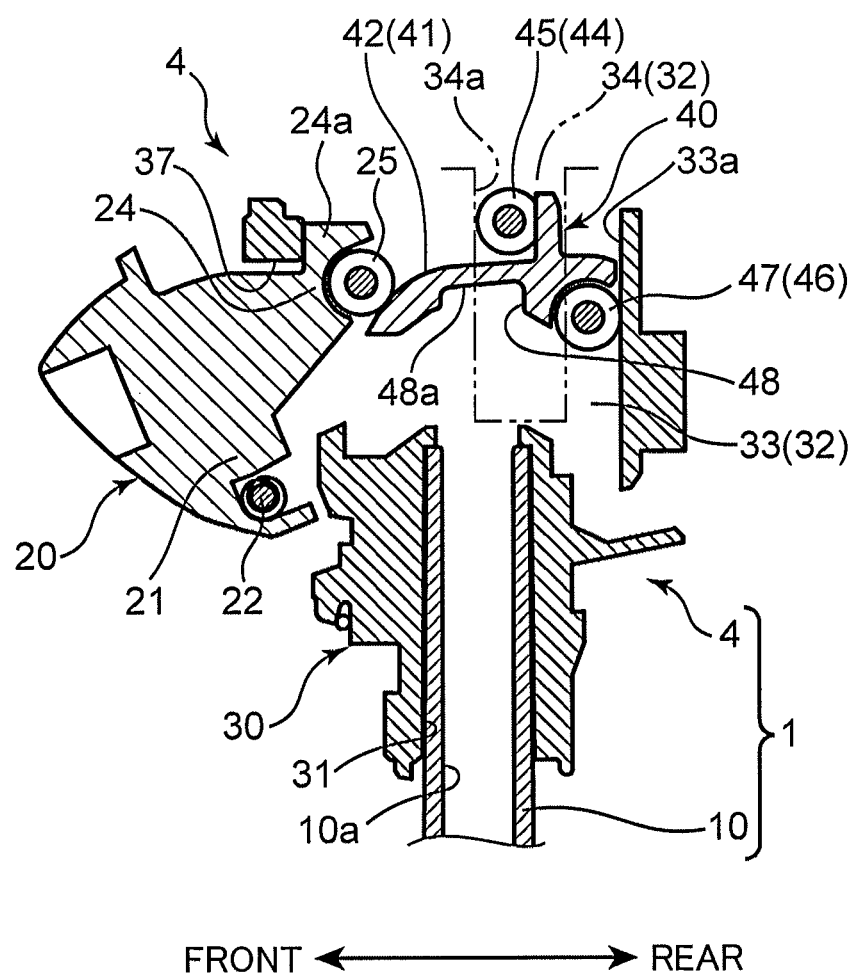
FIG. 7 is a cross-sectional view of the main components of the shift knob without the cross-sectional view of the push rod.

FIG. 4 is a perspective view of the shift knob 4 seen from above in an uncovered state without the covers. FIG. 5 is a perspective view of the slider 40. FIG. 6A and FIG. 7 are each a cross-sectional view of main components of the shift knob 4 and illustrate a state before the button 20 receives a pushing manipulation. FIG. 7 omits illustration of the push rod 12.

As illustrated in FIG. 2, FIG. 4, FIG. 6A, and FIG. 7, the slider 40 is slidably arranged in the guide recess part 32 of the holder 30. The guide recess part 32 defines a guide hole in a recess extending downward from an upper surface of the holder 30. The guide recess part 32 has an inner bottom surface formed with the fitting hole 31 as an opening. The upper end 12a of the push rod 12 protrudes into the guide recess part 32 through the opening.

As illustrated in FIG. 5, the slider 40 has a pushed part 41, a front guide part 44, and a rear guide part 46 from the front in this order. The front guide part 44 protrudes leftward and rightward from the pushed part 41 and the rear guide part 46. The slider 40 hence has a substantially cross-shape in a plan view.

The pushed part 41 is pushed by the button 20 when the button 20 receives a pushing manipulation. The pushed part 41 has a pushed surface 42. As illustrated in FIG. 2, FIG. 6A, and FIG. 7, the pushing part 24 (the pushing roller 25) of the button 20 comes into contact with the pushed surface 42 from above. The pushing part 24 is arranged in the guide recess part 32 from the front of the holder 30 via the opening part 37 as described above.

The pushed surface 42 slopes upward as advancing rearward from the front. The slider 40 is accordingly pushed upward along the guide recess part 32 as the button 20 moves rearward in response to the pushing manipulation force.

Figure 6B:
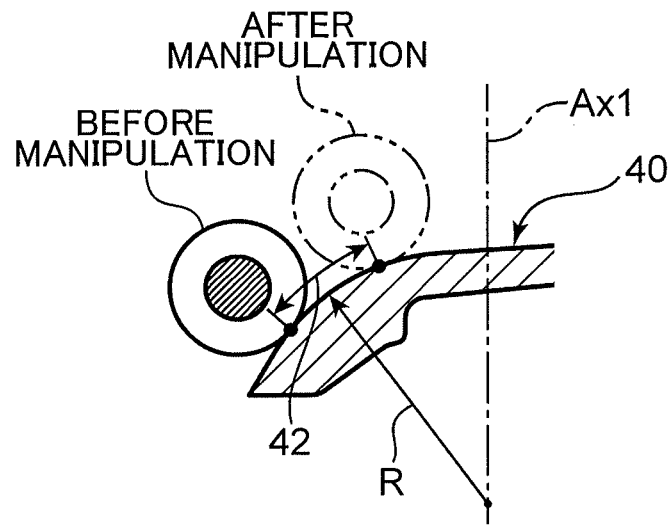
FIG. 6B is an enlarged view of the main components in FIG. 6A.

The pushed surface 42 curves, or curves in cross-section, to nonlinearly change a moving amount of the slider 40, that is, nonlinearly change a shifting amount of the push rod 12, in relation to a pushing manipulation amount of the button 20. In this example, the pushed surface 42 curves upward as advancing rearward to make a shifting amount of the push rod 12 for a predetermined manipulation amount of the button larger mainly in a former stage of the pushing manipulation to the button 20 than mainly in a latter stage of the pushing manipulation. Specifically, the pushed surface 42 curves in an arc, or curves in an arc in cross-section. In this example, as illustrated in FIG. 6B, the pushed surface 42 is in an arch having a radius R from a center on a central axis Ax1 of the push rod 12. The radius of the pushed surface 42 in the arc is set on the basis of a relation between a manipulation stroke of the button 20 and a manipulation force or a manipulation load of the button 20.

The pushed surface 42 is a surface with which the pushing part 24 (pushing roller 25) actually comes into contact to push the slider 40. The pushed surface 42 occupies a region denoted by the left-right arrow in FIG. 6B. FIG. 6B is an enlarged view of the main components in FIG. 6A to show the portion of the pushed surface 42.

In this example, the pushed surface 42 occupies a region of the slider 40 that is located frontward from the central axis Ax1 of the push rod 12, i.e., in a releasing direction of the button 20 that is opposite to the pushing direction. The button 20 pushes only the region of the slider 40 that is located frontward from the central axis Ax1 of the push rod 12.

The pushed part 41 is further provided with a pair of left and right side walls 43 to sandwich the pushed surface 42. The side walls 43 restrict the position of the pushing part 24. The side walls 43 determine positions of the button 20 and the slider 40 relative to each other in the left-right direction.

The front guide part 44 is located at the rear of the pushed part 41 and protrudes leftward and rightward from the pushed part 41 as described above. The protruding portions are respectively provided with guide rollers 45. The rear guide part 46 is arranged opposite to (at the rear of) the pushed part 41 across the front guide part 44. The rear guide part 46 is provided with a guide roller 47 in the same manner as the front guide part 44. The guide rollers 45, 47 are rotatable around their respective shafts extending in the left-right direction.

As illustrated in FIG. 5, FIG. 6A, and FIG. 7A, each guide roller 45 of the front guide part 44 and the guide roller 47 of the rear guide part 46 are offset to be displaced from each other in the up-down direction. Specifically, the guide roller 47 of the rear guide part 46 is located below the guide roller 45 of the front guide part 44 to be closer to the lever shaft 10.

In other words, the front guide roller 45 of the front guide part 44 and the guide roller 47 of the rear guide part 46 are offset to be displaced from each other in the front-rear direction, the up-down direction, and the left-right direction. It is noted here that the guide roller 45 of the front guide part 44 is also referred to as a "front guide roller 45" and the guide roller 47 of the rear guide part 46 is also referred to as a "rear guide roller 47" in the following description.

The slider 40 has: a main part 40P entirely made of resin and integrally formed except the guide rollers 45, 47 and their respective support shafts; and the guide rollers 45, 47 and other components made of metal and assembled to the main part 40P. In this configuration, as illustrated in FIG. 5, the front guide roller 45 has a portion exposed frontward from the main part 40P, and the rear guide roller 47 has a portion exposed rearward from the main part 40P.

The slider 40 (the main part 40P) has a lower surface formed with a recess part 48 having a recess extending upward. The recess part 48 has an end surface or a top surface defined as a contact surface 48a with which the push rod 12 comes into contact. As illustrated in FIG. 6A, the upper end 12a of the push rod 12 urged upward with the elastic force of the compression coil spring is in contact with the contact surface 48a. When the button 20 pushes the slider 40 downward in response to the pushing manipulation force, the push rod 12 shifts downward against the elastic force of the compression coil spring. In other words, the slider 40 converts a rearward momentum of the button 20 into a downward momentum of the push rod 12.

In this example as illustrated in FIG. 2 and FIG. 6A, the upper end 12a of the push rod 12 has a spherical shape. The push rod 12 is thus in point contact with the contact surface 48a. The contact surface 48a slopes upward as advancing rearward from the front. Specifically, as illustrated in FIG. 6A, the contact surface 48a is defined such that an angle θ between an imaginary plane perpendicularly intersecting the central axis Ax1 of the push rod 12 and the contact surface 48a satisfies "0°<θ<11°". In this example, the contact surface 48a is defined to satisfy "θ=5.5°". This configuration makes the push rod 12 always pressed rearward from the slider 40 as denoted by the white arrow in FIG. 6A. In other words, the contact surface 48a is a slope that slopes with respect to the imaginary plane perpendicularly intersecting the push rod 12 to make the push rod 12 pressed rearward or in a specific direction along the pushing manipulation direction of the button 20.

As illustrated in FIG. 4, the guide recess part 32 of the holder 30 has a substantially cross-shape in cross-section to meet a planar contour of the slider 40. Specifically, the guide recess part 32 has a main recessed section 33 in a rectangular cross-sectional shape which is long and thin in the front-rear direction, and a pair of groove sections 34 respectively extending along left and right inner walls of the main recessed section 33 and facing each other.

The slider 40 is arranged in the guide recess part 32 in such a manner that the front guide part 44 is located in the groove sections 34 and the remaining parts are located in the main recessed section 33. As illustrated in FIG. 4 and FIG. 7, each front guide roller 45 is in contact with an associated front surface 34a (referred to as a "front guide surface 34a") of the associated groove section 34, and the rear guide roller 47 is in contact with a rear guide surface 33a (referred to as a "rear guide surface 33a") of the main recessed section 33. This configuration enables the holder 30 to hold the slider 40 slidably in the up-down direction.

The rear guide surface 33a is located at a position (a rear position) in a direction along the pushing direction (the front-rear direction) of the button 20 to face in the releasing direction (frontward). The front guide surface 34a is located at another position (a front position) in the direction along the pushing direction (the front-rear direction) of the button 20 to be opposite to the rear guide surface 33a. In this example, the rear guide surface 33a corresponds to the "first guide surface" in the present invention and the front guide surface 34a corresponds to the "second guide surface" in the present invention. The rear guide roller 47 corresponds to the "first rolling member" in the present invention and the front guide roller 45 corresponds to the "second rolling member" in the present invention.

The covers for the shift knob 4 are assembled to the holder 30 to constitute an outer surface structure or an exterior of the holder. As illustrated in FIG. 3, the covers include, for example, a right cover 50R, a left cover 50L, a center cover 50C, and a bottom cover 50D. The right cover 50R mainly constitutes a right exterior of the shift knob 4 and the left cover 50L mainly forms a left exterior of the shift knob 4. The center cover 50C is located between the right cover 50R and the left cover 50L to constitute a center exterior extending from a top center to a rear center of the shift knob 4. The bottom cover 50D constitutes an exterior of a connection portion of the shift knob 4 to the lever main body 2.

Operational Effects of the Shift Lever 1

Figure 8A:
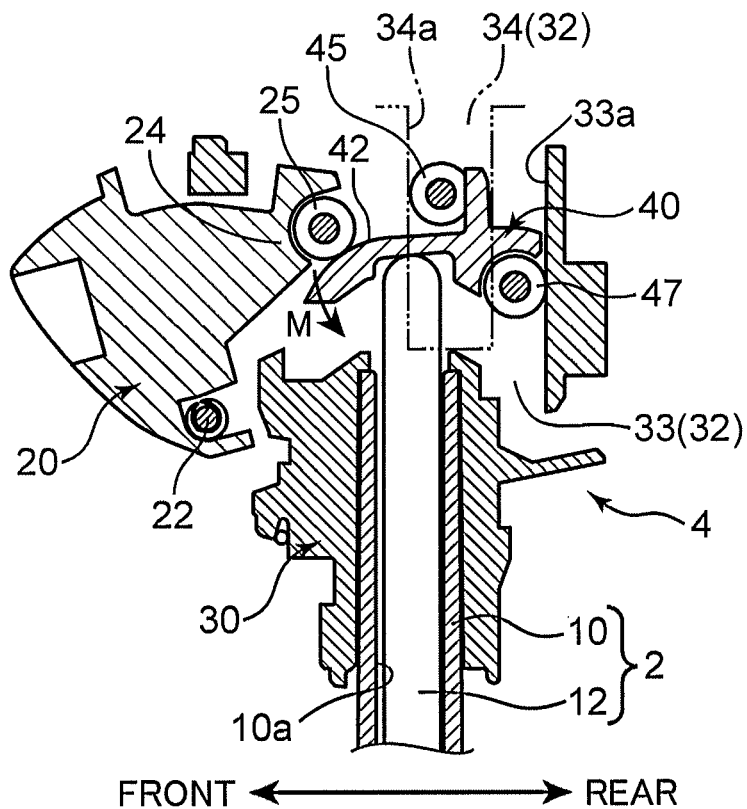
FIG. 8A includes cross-sectional views of the shift lever for describing an operation of the push rod performed in response to a manipulation to a button.
Figure 8B:
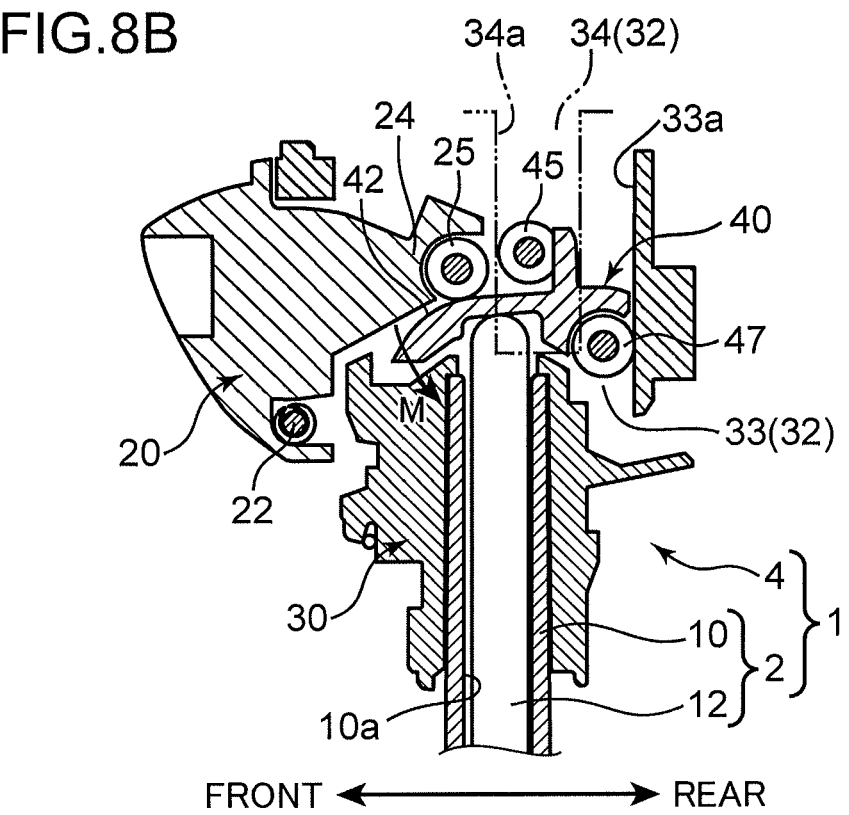
FIG. 8B includes cross-sectional views of the shift lever for describing an operation of the push rod performed in response to a manipulation to a button.

FIG. 8 includes cross-sectional views of the shift lever 1 for describing an operation of the push rod 12 performed in response to a pushing manipulation to the button 20. FIG. 8A illustrates a state in progress of the pushing manipulation to the button, and FIG. 8B illustrates a state at a finish of the pushing manipulation to the button.

A driver grips the lever main body 2 and pushes the button 20 rearward to change a range of the automatic transmission. Such a pushing manipulation results in releasing the shift lever 1 from a locked state. Pushing the button 20 rearward from the home position (shown in FIG. 6A) makes the pushing part 24 (the pushing roller 25) push the slider 40 downward while moving rearward along the pushed surface 42 of the slider 40 as illustrated in FIG. 8A. The push rod 12 shifts downward as the slider 40 moves.

When the button 20 is fully pushed, that is, when the button 20 moves from the home position to a manipulation stroke end, the push rod 12 shifts to a downward end and the shift lever 1 is released from the locked state as illustrated in FIG. 8B. Consequently, the driver can change the range of the automatic transmission by manipulating the shift lever 1 in a swingable manner.

When the driver lets go of the button 20, the push rod 12 shifts upward with an urging force of the compression coil spring, and the slider 40 and the button 20 return to their original positions in synchronization with the upward shifting of the push rod 12. The shift lever 1 is consequently locked at a position for a selected range.

The shift lever 1 provides the following advantageous effects in the sequential operation of the shift lever 1 described above.

First, the pushed surface 42 of the slider 40 is located frontward from the central axis Ax1 of the push rod 12 in the shift lever 1. This configuration always keeps a rotation moment M, which acts on the slider 40 around the upper end 12a of the push rod 12 serving as the fulcrum, in the same direction from a start to a finish of a pushing manipulation to the button 20. Specifically, as illustrated in FIG. 6A and FIGS. 8A and 8B, the rotation moment M is always kept in a counterclockwise direction in a left side view of the shift lever 1. This enables the slider 40 to move in a stable posture and thus prevents such an abnormal sound as occurring in the conventional shift lever (Patent Literature 1). Hereinafter, an occurrence of an abnormal sound will be described with reference to FIG. 11.

Figure 11:
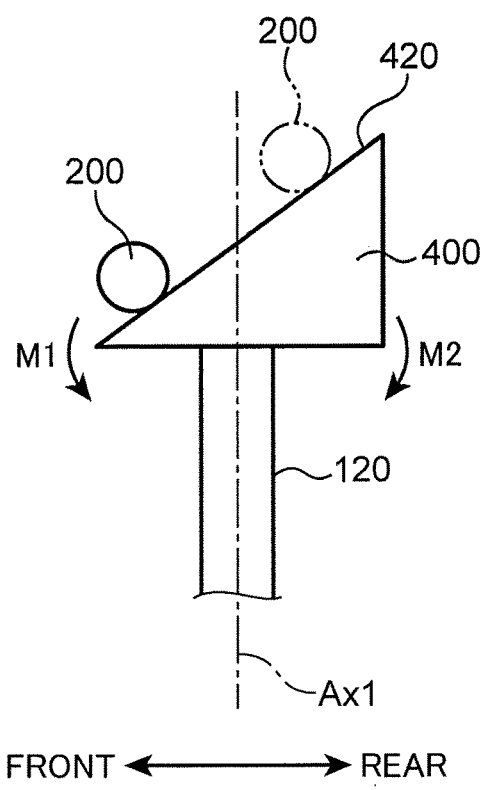
FIG. 11 is a schematic view of main components of a configuration of a conventional shift lever.

FIG. 11 is a schematic view of main components of a configuration of a conventional shift lever, and illustrates a left side of the shift lever. The conventional shift lever includes a slider 400 having a pushed surface 420 which is a slope extending in a front-rear direction across a central axis Ax1 of a push rod 120. A contact position 200 of the button where the button comes into contact with the pushed surface 420 changes from the front to the rear across the central axis Ax1 in progress of a pushing manipulation to the button. When the contact position 200 of the button is in front of the central axis Ax1 mainly in a former stage of the button manipulation as denoted by a solid circle in FIG. 11, a counterclockwise rotation moment M1 acts on the slider 400. When the contact position 200 of the button is at the rear of the central axis Ax1 mainly in a latter stage of the button manipulation as denoted by a long dashed double-short dashed circle in FIG. 11, a clockwise rotation moment M2 acts on the slider 400. The slider 400 having received the rotation moment M1 or M2 acting thereon may tilt in the front-rear direction within a range of a sliding gap, and further may tilt in a different direction when the rotation moment is reversed in the opposite direction. That is to say, the position of the central axis Ax1 serves as a change point. As a result, the slider 400 and an unillustrated holder may collide with each other and make an abnormal sound or a collision sound.

By contrast, in the shift lever 1, the rotation moment M acting on the slider 40 is kept in the same direction from a start to a finish of a pushing manipulation to the button 20 without reversing of the rotation moment M in the opposite direction, as described above.

In addition, the shift lever 1 satisfactorily suppresses or prevents tilting of the slider 40. Specifically, the slider 40 has the front guide roller 45 that comes into contact with the front guide surface 34a of the guide recess part 32 and the rear guide roller 47 that comes into contact with the rear guide surface 33a. The front guide roller 45 is offset to be located above the rear guide roller 47. When the rotation moment M acts as illustrated in FIG. 6A in response to a button manipulation under the setting, the slider 40 has a posture restricted between the front guide surface 34a and the rear guide surface 33a without any likelihood of tilting in the front-rear direction. Besides, the front guide roller 45 and the rear guide roller 47 offset to be displaced from each other in the left-rear direction prevents or suppresses tilting of the slider 40 around the central axis Ax1 of the push rod 12.

In the shift lever 1, the slider 40 thus moves in a more stable posture in response to the pushing manipulation force to the button 20. This results in preventing an occurrence of such an abnormal sound or a collision sound as seen in a conventional configuration.

The slider 40 is configured to move while bringing the guide rollers 45, 47 into contact with the inner surfaces (the rear guide surface 33a and the front guide surfaces 34a) of the guide recess part 32, as described above. This configuration eliminates the likelihood that the slider 40 and the holder 30 rub against each other. The shift lever 1 thus enables the slider 40 to more smoothly move and achieves improvement in comfortable feeling at a pushing manipulation to the button 20.

In the shift lever 1, the slider 40 always presses the push rod 12 rearward (see the white arrow in FIG. 6A). The push rod 12 thus shifts while being always pressed onto the inner rear wall defining the shaft hole 10a as illustrated in FIG. 6A and FIGS. 8A and 8B in the manipulation to the button 20.

This configuration easily stabilizes the behavior of the push rod 12 in the pushing manipulation to the button. For instance, the configuration prevents the push rod 12 from unstably moving in a radial direction in the shaft hole 10a and colliding with the inner wall defining the shaft hole 10a to make an abnormal sound or a collision sound.

In the shift lever 1, the upper end 12a of the push rod 12 has a spherical shape so that the push rod 12 comes into point contact with the contact surface 48a. Thus, the push rod 12 is less likely to have an influence of such a manufacturing difference or a variation in manufacturing tolerance as seen in the slider 40 in the direction of a manipulation load which the push rod receives. The configuration hence allows the push rod 12 to be reliably pressed rearward. This leads to highly increased stability of the behavior of the push rod 12.

In the shift lever 1, the pushed surface 42 of the slider 40 curves upward as advancing rearward. The shift lever 1 has advantages in a higher degree of freedom for setting a manipulation force of the button 20 than a degree of freedom in the conventional shift lever (see FIG. 11) including the slider having the pushed surface which is a slope, and in setting of the manipulation force of the button 20 to a lower value than a value of the manipulation force in the conventional shift lever. Hereinafter, the advantages will be described with reference to FIG. 9.

Figure 9:
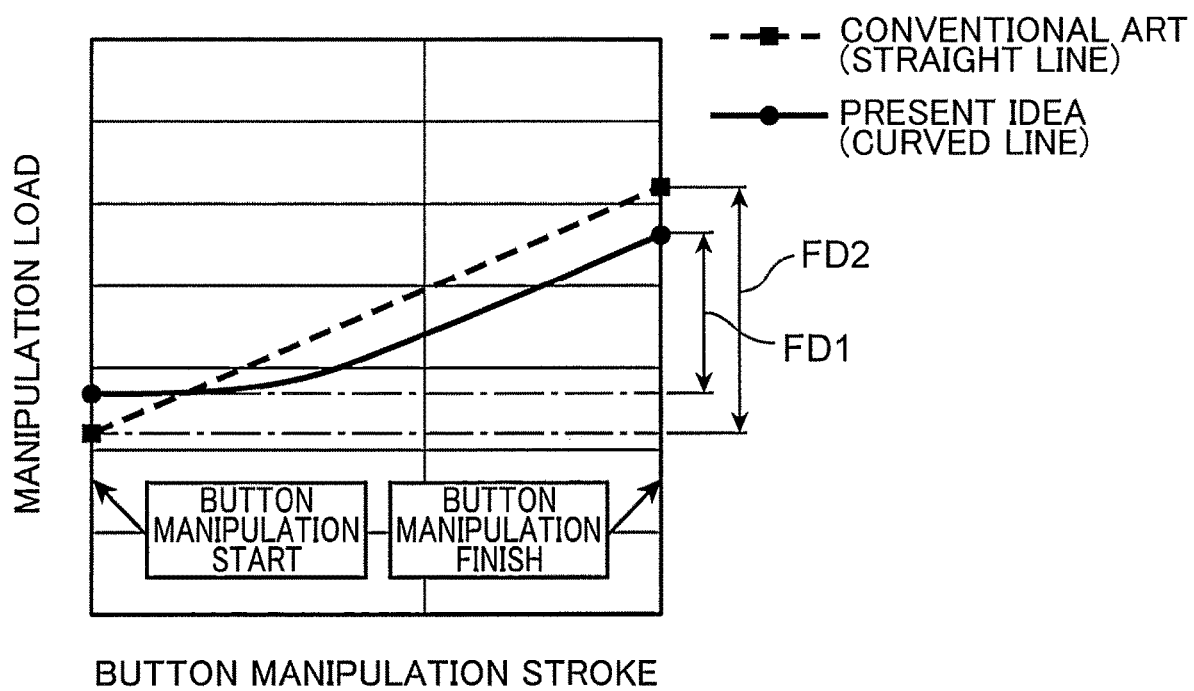
FIG. 9 is a graph showing a relation between a manipulation force or a manipulation load of the button and a manipulation stroke of the button.

FIG. 9 is a graph showing a relation between a manipulation force or a manipulation load of the button and a manipulation stroke of the button. The dashed line denotes the relation concerning the shift lever having a conventional structure and the solid line denotes the relation concerning the shift lever 1. It is noted here that a manipulation stroke of the button and a required shifting amount, i.e., a shifting amount required for unlocking, of the push rod are common in the shift levers.

As for the conventional shift lever including the slider of which pushed surface is a slope, a shifting amount of the push rod linearly changes in relation to a manipulation amount of the button. The manipulation force of the button increases at a constant rate as shown in FIG. 9. The manipulation stroke of the button is restricted in terms of the structure of the shift knob. The slope has a gradient limited to some extent to ensure the required shifting amount of the push rod within a determined manipulation stroke. In this respect, the shift lever having the conventional structure reaches its limit for reducing the manipulation force, and a has a lower degree of freedom for setting the manipulation force.

By contrast, the shift lever 1 including the slider 40 of which the pushed surface 42 curves attains a nonlinear change in the shifting amount of the push rod 12 in relation to the manipulation amount of the button. Such selection of a curvy shape suitable for a target manipulation force leads to achievement in giving a desired manipulation force.

In the shift lever 1, the pushed surface 42 curves in an arc as described above. In this configuration, the shifting amount of the push rod 12 in an initial stage of the pushing manipulation to the button 20 with a relatively small urging force of the compression coil spring is larger than the shifting amount of the push rod 12 in a final stage of the pushing manipulation with a relatively large urging force. As a result, as shown in FIG. 9, a maximum manipulation force of the button 20, that is, a manipulation force at a finish of the pushing manipulation, is reduced to be smaller than the maximum manipulation force in the shift lever having the conventional structure.

FIG. 9 shows that a manipulation force in the initial stage of the manipulation to the button 20 in the shift lever 1 is larger than a manipulation force in the initial stage of the manipulation in the shift lever having the conventional structure. This is because the gradient of the pushed surface 42 (in the arc) in the initial stage of the manipulation is larger than the gradient of the slope in the initial stage of the manipulation in the conventional structure. In this shift lever 1, the manipulation force in the initial stage of the manipulation is higher, and the manipulation force in the final stage is lower in the final stage in this manner. As a result, a difference FD1 between the manipulation force at a start of the manipulation and the manipulation force at a finish of the manipulation is smaller than a difference FD2 between the corresponding manipulations forces in the shift lever having the conventional structure, as illustrated in FIG. 9. In other words, the shift lever 1 allows the driver to manipulate the button 20 at a steadier manipulation force from the start to the finish of the manipulation. This is advantageous in improvement in the operability of the button 20.

MODIFICATIONS

The shift lever 1 described heretofore shows an example of a preferable embodiment of a shift lever according to the present invention, and the specific configuration thereof is appropriately changeable without deviating the scope of gist of the present invention. For instance, the configurations described below fall within the scope of the present invention.

(1) Although the shift lever 1 includes the slider 40 having the guide rollers 45, 47, the shift lever may have a configuration excluding the guide rollers 45, 47. In this configuration, the slider 40 may have guided surfaces in place of the guide rollers 45, 47 to come into contact with the guide surfaces 33a, 34a respectively. This configuration attains suppression or prevention of tilting of the slider 40 in the same manner as the configuration of the shift lever 1. Even if the slider 40 tilts in the front-rear direction within a range of a sliding gap, the rotation moment M acting on the slider 40 is kept in a specific direction. Hence, the slider 40 will never tilt in a different direction in the button manipulation. This consequently enables the slider 40 to move in a stable posture.

(2) Although the slider 40 in the shift lever 1 has guide rollers 45, 47 respectively serving as the first and second rolling members in the present invention, each rolling member is not limited to such a roller. Each rolling member may be any sphere, such as a ball, configured to roll over an inner surface of the guide recess part 32. The slider 40 has a pair of left and right front guide rollers 45 and one rear guide roller 47 located rearward from the front guide rollers 45 and at an intermediate position between the front guide rollers 45. The number of guide rollers 45, 47 and the arrangement of the guide rollers are not limited thereto, and may be appropriately changed. It is noted here that the guide roller 45 and the guide roller 47 are preferably offset to be displaced from each other at least in the front-rear direction and in the up-down direction like the rollers in the shift lever 1 in the embodiment from the perspective of prevention of tilting of the slider 40.

(3) In the shift lever 1, the pushed surface 42 curves (specifically, curves in an arc) to make a shifting amount of the push rod 12 for a predetermined manipulation amount of the button larger mainly in a former stage of the pushing manipulation to the button 20 than mainly in a latter stage of the pushing manipulation. However, the shape of the pushed surface 42 is not specifically limited to the curve. The specific shape of the pushed surface 42, that is, a shape of the curvy surface may be appropriately selected to satisfy a condition, such as a target manipulation force, in a pushing manipulation to the button 20.

(4) In the shift lever 1, the pushed surface 42 of the slider 40 curves upward (in an arc) as advancing rearward. However, the pushed surface 42 may be a slope like a conventional one in any configuration in which the pushed surface 42 is located frontward from the central axis Ax1 of the push rod 12.

(5) Although the contact surface 48a of the slider 40 with which the push rod 12 comes into contact in the shift lever 1 is a slope that slopes upward as advancing rearward from the front, the contact surface may be a slope that slopes the other way around. Specifically, the contact surface 48a may be a slope that slopes downward as advancing rearward from the front to press the push rod 12 frontward. In this configuration, the push rod 12 shifts while being always pressed onto the front inner wall surface defining the shaft hole 10a. The configuration hence can stabilize the behavior of the push rod 12 in the same manner as the embodiment.

Figure 10A:
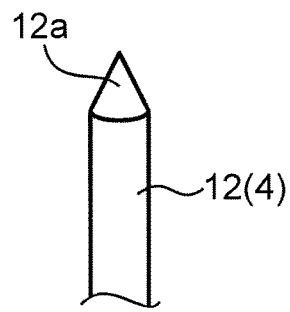
FIG. 10A includes perspective views respectively illustrating modifications concerning a shape of a distal end of the push rod.
Figure 10B:
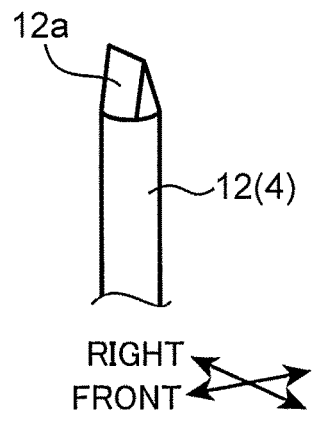
FIG. 10B includes perspective views respectively illustrating modifications concerning a shape of a distal end of the push rod.
Figure 10C:
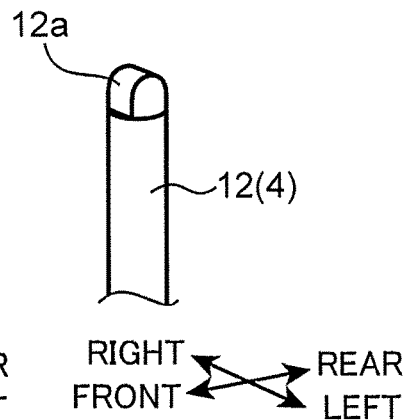
FIG. 10C includes perspective views respectively illustrating modifications concerning a shape of a distal end of the push rod.

(6) In the shift lever 1, the upper end 12a of the push rod 12 has a spherical shape. However, the upper end 12a may have any shape suitable for being always pressed rearward from the slider 40 by contact with the contact surface 48a of the slider 40. In other words, the upper end 12a may have such a shape that the upper end 12a serves as the rotation fulcrum in connection with the contact surface 48a of the slider 40, that is, may have such a shape as to come into point contact or linear contact with the contact surface 48a. Specifically, the upper end 12a may have a cone shape as illustrated in FIG. 10A, a mountain-like shape and a cross-sectionally triangular shape extending in the left-right direction as illustrated in FIG. 10B, or a mountain-like shape and a cross-sectionally semi-circular shape extending in the left-right direction as illustrated in FIG. 10C. The upper end 12a of the push rod 12 may be flat depending on a slope angle of the contact surface 48a under the condition that the push rod 12 is always pressable rearward.

(7) The shift lever 1 includes the button 20 at the front portion of the shift knob 4, and the button 20 is configured to receive a rearward pushing manipulation. However, the button 20 may be provided at one of a left portion and a right portion of the shift knob 4 to receive a pushing manipulation in the left-right direction.

The present invention described heretofore will be summarized in the following manner.

A shift lever according to one aspect of the present invention receives a manipulation force to change a range of an automatic transmission in a vehicle. The shift lever includes: a lever main body; and a shift knob located at a distal end of the main body. The lever main body has a lever shaft, and a push rod located in the lever shaft to be urged toward the distal end. The shift knob has a button for unlocking that receives a pushing manipulation force in a direction intersecting the push rod, a holder fixed to the lever shaft for holding the button, and a converter held by the holder slidably in an axial direction of the push rod by contact with a distal end of the push rod for converting a momentum in a pushing manipulation direction of the button into a momentum in the axial direction to shift the push rod. The converter has a pushed surface to be pushed by the button in response to the pushing manipulation force to move the converter in the axial direction. The pushed surface occupies only a region of the converter that is away from a central axis of the push rod in a releasing direction that is opposite to a pushing direction.

In the shift lever, the pushed surface to be pushed by the button occupies only the region of the converter that is away from the central axis of the push rod in the releasing direction. A rotation moment thus always acts on the converter in the same direction in a button manipulation. In other words, the rotation moment never reverses unlike a rotation moment in a conventional configuration. This consequently allows the converter to move in a more stable posture.

In the shift lever, the holder preferably has a first guide surface located at a position in a direction along the pushing direction to face in the releasing direction and a second guide surface located at another position in the direction along the pushing direction to be opposite to the first guide surface, the first and second guide surfaces guiding the converter in the axial direction. The converter preferably has a first rolling member that comes into contact with the first guide surface and a second rolling member that comes into contact with the second guide surface.

This configuration including the first rolling member that comes into contact with the first guide surface and the second rolling member that comes into contact with the second guide surface prevents or suppresses rubbing of the converter and the holder against each other. The configuration hence enables the converter to more smoothly move in response to a button manipulation.

In this configuration, the first rolling member is preferably offset to be closer to the lever shaft than the second rolling member in the axial direction.

The configuration in which the first rolling member is offset to be closer to the lever shaft than the second rolling member in the axial direction restricts the posture of the converter between the first guide surface and the second guide surface on receipt of the rotation moment acting on the converter. In other words, the converter is structurally prevented from tilting attributed to the button manipulation.

In this shift lever, the first rolling member and the second rolling member are preferably offset to be displaced from each other in a direction perpendicularly intersecting each of the direction along the pushing direction and the axial direction.

This configuration suppresses or prevents tilting of the converter in a rotation direction around the push rod. This consequently allows the converter to move in a more stable posture.

In this shift lever, the converter may have a contact surface with which the distal end of the push rod comes into contact. The contact surface may be a slope that slopes with respect to a plane perpendicularly intersecting the push rod to make the push rod pressed in a specific direction along the pushing manipulation direction.

In this configuration, the push rod is pressed in a specific direction along the pushing manipulation direction in the lever shaft. The configuration thus stabilizes the behavior of the push rod in the lever shaft, and suppresses or prevents an occurrence of an abnormal sound attributed to a collision of the push rod with the inner wall surface of the lever shaft.

In this shift lever, the distal end of the push rod preferably serves as a rotation fulcrum in connection with the contact surface. It is noted here that the term "rotation fulcrum" means that a contact portion of the contact surface and the distal end of the push rod serves as a fulcrum to allow the contact surface and the distal end to rotate around the fulcrum, without an intention of limiting to restriction of relative displacement in a direction along the contact surface or in the axial direction of the push rod. In this respect, the definition of this term differs from the engineering meaning "rotation fulcrum" or support.

For instance, the distal end of the push rod preferably has a spherical shape. This configuration enables transfer of a manipulation load from the converter to the push rod with almost no influence of such a manufacturing difference or a variation in manufacturing tolerance as seen in the converter. The configuration achieves more stable pressing of the push rod in the specific direction, and eventually attains highly increased stability of the behavior of the push rod. This configuration is accordingly effective to stabilize the behavior of the push rod.

In this shift lever, the pushed surface may curve to nonlinearly change a shifting amount of the push rod in relation to a pushing manipulation amount of the button.

This configuration attains a nonlinear change in the shifting amount of the push rod in relation to the pushing amount of the button, and increases a degree of freedom for setting a manipulation force in the button manipulation.

In this configuration, the pushed surface may curve in cross-section. This configuration attains the nonlinear change in the shifting amount of the push rod in response to the pushing manipulation force to the button without giving a driver a discomfort.

In this shift lever, the pushed surface is preferably configured to make the shifting amount of the push rod for a predetermined manipulation amount of the button larger in an initial stage of the pushing manipulation to the button than in a final stage of the pushing manipulation.

In the configuration, the shifting amount of the push rod increases in the initial stage of the pushing manipulation to the button with a relatively small urging force of the push rod. The configuration thus achieves a reduction in the pushing manipulation force (maximum manipulation force) of the button while keeping a required shifting amount of the push rod.

Such a relation between the pushing manipulation amount of the button and the shifting amount of the push rod is achievable with, for example, a pushed surface curving in an arc in cross-section.

The invention claimed is:

1. A shift lever that receives a manipulation force to change a range of an automatic transmission in a vehicle, the shift lever comprising:
    a lever main body; and
    a shift knob located at a distal end of the main body, wherein
    the lever main body has a lever shaft and a push rod located in the lever shaft to be urged toward the distal end,
    the shift knob has a button for unlocking that receives a pushing manipulation force in a direction intersecting the push rod, a holder fixed to the lever shaft for holding the button, and a converter held by the holder slidably in an axial direction of the push rod by contact with a distal end of the push rod for converting a momentum in a pushing manipulation direction of the button into a momentum force in the axial direction to shift the push rod, and
    the converter has a pushed surface to be pushed by the button in response to the pushing manipulation, the pushed surface being configured to be pushed by the button when the button moves from a home position to a stroke end to move the converter in the axial direction,
    the pushed surface occupying only a region of the converter that is away from a central axis of the push rod in a releasing direction that is opposite to a pushing direction.

2. The shift lever according to claim 1, wherein the holder has a first guide surface located at a position in a direction along the pushing direction to face in the releasing direction and a second guide surface located at another position in the direction along the pushing direction to be opposite to the first guide surface, the first and second guide surfaces guiding the converter in the axial direction, and
    the converter has a first rolling member that comes into contact with the first guide surface and a second rolling member that comes into contact with the second guide surface.

3. The shift lever according to claim 2, wherein the first rolling member is offset to be closer to the lever shaft than the second rolling member in the axial direction.

4. The shift lever according to claim 2, wherein the first rolling member and the second rolling member are offset to be displaced from each other in a direction perpendicularly intersecting each of the direction along the pushing direction and the axial direction.

5. The shift lever according to claim 1, wherein the converter has a contact surface with which the distal end of the push rod comes into contact,
    the contact surface being a slope that slopes with respect to a plane perpendicularly intersecting the central axis of the push rod to make the push rod pressed in a specific direction along the pushing manipulation direction.

6. The shift lever according to claim 5, wherein the distal end of the push rod serves as a rotation fulcrum in connection with the contact surface.

7. The shift lever according to claim 6, wherein the distal end of the push rod has a spherical shape.

8. The shift lever according to claim 1, wherein the pushed surface curves to nonlinearly change a shifting amount of the push rod in relation to a pushing manipulation amount of the button.

9. The shift lever according to claim 8, wherein the pushed surface curves in a cross-section of the pushed surface taken along a line extending in the pushing direction.

10. The shift lever according to claim 8, wherein the pushed surface is defined to make the shifting amount of the push rod for a predetermined manipulation amount of the button larger in an initial stage of the pushing manipulation to the button than in a final stage of the pushing manipulation.

11. The shift lever according to claim 10, wherein the pushed surface curves in an arc in a cross-section of the pushed surface taken along a line extending in the pushing direction.

12. A shift lever that receives a manipulation force to change a range of an automatic transmission in a vehicle, the shift lever comprising:
   a lever main body; and
   a shift knob located at a distal end of the main body, wherein
   the lever main body has a lever shaft and a push rod located in the lever shaft to be urged toward the distal end,
   the shift knob has a button for unlocking that receives a pushing manipulation force in a direction intersecting the push rod, a holder fixed to the lever shaft for holding the button, and a converter held by the holder slidably in an axial direction of the push rod by contact with a distal end of the push rod for converting a momentum in a pushing manipulation direction of the button into a momentum force in the axial direction to shift the push rod,
   the converter has a pushed surface to be pushed by the button in response to the pushing manipulation to move the converter in the axial direction,
   the pushed surface occupies only a region of the converter that is away from a central axis of the push rod in a releasing direction that is opposite to a pushing direction,
   the holder has a first guide surface located at a position in a direction along the pushing direction to face in the releasing direction and a second guide surface located at another position in the direction along the pushing direction to be opposite to the first guide surface, the first and second guide surfaces guiding the converter in the axial direction, and
   the converter has a first rolling member that comes into contact with the first guide surface and a second rolling member that comes into contact with the second guide surface.

13. A shift lever that receives a manipulation force to change a range of an automatic transmission in a vehicle, the shift lever comprising:
   a lever main body; and
   a shift knob located at a distal end of the main body, wherein
   the lever main body has a lever shaft and a push rod located in the lever shaft to be urged toward the distal end,
   the shift knob has a button for unlocking that receives a pushing manipulation force in a direction intersecting the push rod, a holder fixed to the lever shaft for holding the button, and a converter held by the holder slidably in an axial direction of the push rod by contact with a distal end of the push rod for converting a momentum in a pushing manipulation direction of the button into a momentum force in the axial direction to shift the push rod, and
   the converter has a pushed surface to be pushed by the button in response to the pushing manipulation to move the converter in the axial direction, and a recess part having an end surface serving as a contact surface which contacts the distal end of the push rod,
   the pushed surface occupying only a region of the converter that is away from a central axis of the push rod in a releasing direction that is opposite to a pushing direction,
   the contact surface being a slope that slopes with respect to a plane perpendicularly intersecting the central axis of the push rod to press the push rod in one of the pushing direction and the releasing direction.

* * * * *